United States Patent
Lee et al.

(10) Patent No.: US 9,315,882 B2
(45) Date of Patent: Apr. 19, 2016

(54) METHOD FOR PREPARING ANODE ACTIVE MATERIAL, ANODE ACTIVE MATERIAL PREPARED THEREFROM AND LITHIUM SECONDARY BATTERY HAVING THE SAME

(71) Applicant: LG Chem, Ltd., Seoul (KR)

(72) Inventors: Mi-Rim Lee, Seoul (KR); Yong-Ju Lee, Daejeon (KR); Je-Young Kim, Daejeon (KR); Hye-Ran Jung, Busan (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/185,182

(22) Filed: Feb. 20, 2014

(65) Prior Publication Data

US 2014/0170485 A1    Jun. 19, 2014

Related U.S. Application Data

(63) Continuation of application No. PCT/KR2012/008771, filed on Oct. 24, 2012.

(30) Foreign Application Priority Data

Oct. 24, 2011  (KR) .................. 10-2011-0108782
Oct. 24, 2012  (KR) .................. 10-2012-0118431

(51) Int. Cl.

| | | |
|---|---|---|
| H01M 4/02 | (2006.01) | |
| C22C 29/12 | (2006.01) | |
| H01M 4/36 | (2006.01) | |
| H01M 4/62 | (2006.01) | |
| H01M 4/485 | (2010.01) | |
| H01M 4/139 | (2010.01) | |
| H01M 4/38 | (2006.01) | |
| H01M 4/131 | (2010.01) | |
| H01M 10/052 | (2010.01) | |
| H01M 4/1391 | (2010.01) | |
| H01M 4/40 | (2006.01) | |
| H01M 4/48 | (2010.01) | |

(52) U.S. Cl.
CPC ............ *C22C 29/12* (2013.01); *H01M 4/139* (2013.01); *H01M 4/366* (2013.01); *H01M 4/386* (2013.01); *H01M 4/485* (2013.01); *H01M 4/628* (2013.01); *H01M 4/131* (2013.01); *H01M 4/1391* (2013.01); *H01M 4/40* (2013.01); *H01M 4/483* (2013.01); *H01M 4/625* (2013.01); *H01M 10/052* (2013.01); *Y02E 60/122* (2013.01)

(58) Field of Classification Search
CPC ..................................................... H01M 4/36
See application file for complete search history.

(56) References Cited

U.S. PATENT DOCUMENTS

| | | | |
|---|---|---|---|
| 2003/0044684 A1 | 3/2003 | Nanamoto et al. | |
| 2003/0053945 A1* | 3/2003 | Fukuoka et al. | ............ 423/332 |
| 2007/0224508 A1 | 9/2007 | Aramata et al. | |
| 2008/0193831 A1* | 8/2008 | Mah et al. | ............ 429/122 |

FOREIGN PATENT DOCUMENTS

| | | |
|---|---|---|
| CN | 102122708 A | 7/2011 |
| EP | 2372816 A1 | 10/2011 |
| JP | H09-231963 A | 9/1997 |
| JP | 2000-149925 A | 5/2000 |
| JP | 2001-273898 A | 10/2001 |
| JP | 200317054 | 1/2003 |
| JP | 2011-23121 A1 | 2/2011 |
| KR | 10-2008-0074157 A | 8/2008 |
| WO | 2010146759 A1 | 12/2010 |
| WO | 2011030486 A1 | 3/2011 |
| WO | 2014-049992 A1 | 4/2014 |

OTHER PUBLICATIONS

International Search Report for PCT/KR2012/008771 mailed Mar. 12, 2013.
Search Report from European Application No. 12844589.7, dated Mar. 9, 2015.

* cited by examiner

*Primary Examiner* — Jacob Marks
(74) *Attorney, Agent, or Firm* — Lerner, David, Littenberg, Krumholz & Mentlik, LLP

(57) ABSTRACT

The present invention relates to a method for preparing an anode active material, comprising (S1) forming a shell being a coating layer comprising a carbon material on the surface of a core comprising silicon oxide particles, to obtain a silicon oxide-carbon composite having a core-shell structure; (S2) mixing the silicon oxide-carbon composite with an oxygen-containing lithium salt, followed by heat treatment to produce a silicon oxide-lithium alloy, thereby obtaining a ($SiO_x$—$Li_y$)—C ($0<x<1.5$, $0<y<4$) composite having a core-shell structure; and (S3) washing the surface of the ($SiO_x$—$Li_y$)—C composite having a core-shell structure and drying the composite, and an anode active material prepared by the method.

5 Claims, No Drawings

METHOD FOR PREPARING ANODE ACTIVE MATERIAL, ANODE ACTIVE MATERIAL PREPARED THEREFROM AND LITHIUM SECONDARY BATTERY HAVING THE SAME

CROSS-REFERENCE TO RELATED APPLICATION(S)

This application is a continuation of International Application No. PCT/KR2012/008771 filed on Oct. 24, 2012, which claims priority under 35 USC 119(a) to Korean Patent Application Nos. 10-2011-0108782 and 10-2012-0118431 filed in the Republic of Korea on Oct. 24, 2011 and Oct. 24, 2012, respectively, the disclosures thereof are incorporated herein by reference.

TECHNICAL FIELD

The present invention relates to a method for preparing an anode active material comprising a silicon oxide, an anode active material prepared therefrom, and a lithium secondary battery having the anode active material.

BACKGROUND ART

Recently, there has been growing interest in energy storage technologies. As energy storage technologies are extended to devices such as cellular phones, the intensive research and development of electrochemical devices has been made. In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Among currently available secondary batteries, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

For this, the demand for an anode material having a high capacity is increasing. In order to meet the demand, Si-based materials having a large theoretical capacity have been used as an anode active material, however, Si deteriorates the life characteristics of batteries during repeated charging/discharging processes and causes severe thickness swelling, which adversely affects the performances and safety of the batteries. Accordingly, in order to maintain life characteristics and reduce thickness swelling, attempts have been made to use a silicon oxide ($SiO_x$). However, the silicon oxide forms an irreversible phase due to the insertion of lithium, and thus has a low initial efficiency. To solve such a problem, the silicon oxide is first alloyed with lithium so that it contains lithium, thereby forming less of an irreversible phase material such as lithium oxides and lithium-metal oxides during initial charging and discharging processes, and eventually improving the initial efficiency of an anode active material. The lithium source, which is used to first alloy a silicon oxide with lithium, may be divided into a lithium source using metallic lithium, a lithium salt having no oxygen, and an oxygen-containing lithium salt.

Among these, the metallic lithium has a great reactivity with water and may be dangerously apt to ignite, and may also react with carbon dioxide to produce lithium carbonate. Also, most lithium salts not containing oxygen are formed by an ionic bond, and thus the reaction of lithium salts and silicon oxides is very restricted. Therefore, it is preferable to use lithium salts containing oxygen.

However, while silicon oxides react with lithium salts containing oxygen, oxygen present in the lithium salts react with the silicon oxides, thereby making it hard to control the amount of oxygen in the silicon oxides. Also, the remaining unreacted lithium sources and by-products of the reaction between the lithium sources and the silicon oxide may lead to the gelation of an anode active material-containing slurry in the preparation of an electrode.

DISCLOSURE

Technical Problem

Therefore, it is an object of the present invention to provide a method for preparing an anode active material which is easy to control the amount of oxygen present in a silicon oxide and can minimize performance deterioration due to remaining lithium sources, and by-products of the reaction between lithium sources and the silicon oxide, an anode active material prepared therefrom, and a lithium secondary battery having the anode active material.

Technical Solution

In order to achieve the object, the present invention provides a method for preparing an anode active material, comprising (S1) forming a shell being a coating layer comprising a carbon material on the surface of a core comprising silicon oxide particles, to obtain a silicon oxide-carbon composite having a core-shell structure; (S2) mixing the silicon oxide-carbon composite with an oxygen-containing lithium salt, followed by heat treatment to produce a silicon oxide-lithium alloy, thereby obtaining a ($SiO_x$—$Li_y$)—C (0<x<1.5, 0<y<4) composite having a core-shell structure; and (S3) washing the surface of the ($SiO_x$—$Li_y$)—C composite having a core-shell structure and drying the composite.

The silicon oxide may be SiO or $SiO_2$. Also, the silicon oxide may further comprise Si. In addition, the carbon material may be crystalline carbon or amorphous carbon.

The core comprising the particles of such a silicon oxide has preferably a diameter of 0.05 to 30 μm. Also, in the shell being a coating layer comprising a carbon material, the carbon material is preferably present in an amount of 0.05 to 30 wt % based on the weight of the anode active material.

In addition, the examples of the oxygen-containing lithium salt may include $Li_2B_4O_7$, $LiNO_3$, $LiO_2$, $Li_2O_2$, $Li_2CO_3$, $LiOH(H_2O)$ and LiOH, but are not particularly limited thereto.

In step (S2), the weight ratio of the silicon oxide-carbon composite and the oxygen-containing lithium salt is preferably in the range of 30:70 to 95:5.

As a washing solution for washing, distilled water, ethanol or a strong-acid solution may be used, but is not particularly limited thereto.

Also, the present invention provides an anode active material prepared by the above-mentioned method, which comprises a core-shell structured ($SiO_x$—$Li_y$)—C composite ($0<x<1.5$, $0<y<4$) which has a core comprising ($SiO_x$—$Li_y$), and a shell coated on the surface of the core and comprising a carbon material, wherein the core-shell structured ($SiO_x$—$Li_y$)—C composite comprises an unreacted oxygen-containing lithium salt in an amount of 5 wt % or less, and by-products of the reaction between an oxygen-containing lithium salt and silicon oxide in an amount of 10 wt % or less.

The carbon material may be crystalline carbon or amorphous carbon.

The core comprising ($SiO_x$—$Li_y$) has preferably a diameter of 0.05 to 30 μm. Also, in the shell being a coating layer comprising a carbon material, the carbon material is preferably present in an amount of 0.05 to 30 wt % based on the weight of the anode active material.

In addition, the by-products of the oxygen-containing lithium salt may be LiOH, $Li_2CO_3$, $Li_4SiO_4$, $Li_2Si_3O_5$, $Li_2Si_2O_5$, $Li_8O_2(SiO_4)$, or $Li_6(Si_2O_7)$, but are not particularly limited thereto.

Further, the present invention provides an anode of a lithium secondary battery, comprising a current collector; and an anode active material layer formed on at least one surface of the current collector and comprising the anode active material comprising a core-shell structured ($SiO_x$—$Li_y$)—C composite.

Furthermore, the present invention provides a lithium secondary battery, comprising a cathode, the anode using the anode active material comprising a core-shell structured ($SiO_x$—$Li_y$)—C composite, and a separator interposed between the cathode and the anode.

Advantageous Effects

In accordance with the method of present invention, which prepares an anode active material of a ($SiO_x$—$Li_y$)—C composite having a core-shell structure, a silicon oxide-core has a carbon material-coating layer on the surface thereof to prevent oxygen present in an oxygen-containing lithium salt from infiltrating into silicon oxides, thereby easily controlling the amount of oxygen present in the silicon oxides. Also, the anode active material of the present invention can be prevented from the gelation of an anode active material slurry by removing the remaining lithium sources and by-products of the reaction between lithium sources and silicon oxides. In addition, an anode active material of a ($SiO_x$—$Li_y$)—C composite having a core-shell structure, prepared by such method provides high capacity, good life characteristics and superior thickness expansion control to batteries.

Also, the inventive method for preparing an anode active material can easily control the thickness of the coating layer formed on the surface of the carbon material by controlling a density of an applied electric current and time. From the inventive method, a semibath-type reactor can also be designed and an electrolyte used for electroplating can be recovered.

BEST MODE

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The anode active material of the present invention is obtained by the introduction of lithium, and comprises a core-shell structured ($SiO_x$—$Li_y$)—C composite ($0<x<1.5$, $0<y<4$) having a core comprising ($SiO_x$—$Li_y$), and a shell coated on the surface of the core and comprising a carbon material.

Such an anode active material of the present invention, which comprises a core-shell structured ($SiO_x$—$Li_y$)—C composite ($0<x<1.5$, $0<y<4$), may be prepared according to the following method.

First, a shell being a coating layer comprising a carbon material is formed on the surface of a core comprising silicon oxide particles, to obtain a silicon oxide-carbon composite having a core-shell structure (S1).

The silicon oxide may be SiO, $SiO_2$, or a mixture thereof and to control the oxygen content of the final product of the silicon oxide, the silicon oxide may further comprise Si as needed.

The core comprising the particles of such a silicon oxide is prepared and a carbon material is coated on its surface to obtain a silicon oxide-carbon composite having a core-shell structure and preferably has a diameter of 0.05 to 30 μm. Also, the carbon material may be crystalline carbon or amorphous carbon and in the shell being a coating layer comprising a carbon material, the carbon material is preferably present in an amount of 0.05 to 30 wt % based on the weight of the anode active material.

In the case that crystalline carbon is used as the carbon material, the coating layer of the carbon material may be formed by solid- or liquid-mixing of the core and crystalline carbon, followed by carrying out a coating process. The solid-mixing may be mainly made by various mechanical mixing manners, such as kneading, mechanical mixing which changes the wing structure of a mixture so as to apply shear stress, and mechanochemical mixing which induces the fusion of particle surfaces by mechanically applying shear stress to particles. The liquid-mixing may be made by mechanical mixing, similar to the solid-mixing, spray drying, spray pyrolysis or freeze drying. In the liquid-mixing, a solvent such as water, an organic solvent and a mixture thereof may be used. Examples of the organic solvent which may be used include ethanol, isopropyl alcohol, toluene, benzene, hexane and tetrahydrofuran. In the case that amorphous carbon is used as the carbon material, the coating layer may be formed by coating an amorphous carbon precursor, followed by heat-treatment for the carbonization of the carbon precursor. The coating may be carried out in a dry or wet manner, or in the combination thereof. Also, a deposition method, such as chemical vapor deposition (CVD) using a carbon-containing gas such as methane, ethane and propane may be used. Examples of the amorphous carbon which may be used in the present invention include resins such as phenol, naphthalene, urethane, polyimide, furan, cellulose, epoxy and polystyrene, coal tar pitch, petroleum-derived pitch, tar and low molecular weight heavy oil.

Then, the silicon oxide-carbon composite is mixed with a oxygen-containing lithium salt, followed by heat treatment to produce a silicon oxide-lithium alloy, thereby obtaining a ($SiO_x$—$Li_y$)—C ($0<x<1.5$, $0<y<4$) composite having a core-shell structure (S2).

The silicon oxide-carbon composite and the oxygen-containing lithium salt are mixed in a weight ratio of 30:70 to 95:5. If the amount of the oxygen-containing lithium salt is less than 5 wt %, the lithium content of the final product is insufficient that it cannot provide a high initial efficiency. If the amount of the oxygen-containing lithium salt is higher than 70 wt %, the final product has an excess amount of lithium silicate in inactive phases thereby reducing a discharge capacity per unit weight.

The mixture of the silicon oxide-carbon composite and the oxygen-containing lithium salt needs heat treatment so as to form a silicon oxide-lithium alloy, and the heat treatment may be carried out at a temperature of 500 to 1200° C., preferably 800 to 1000° C. Also, the heat treatment is preferably carried out under inert gas atmosphere.

In the silicon oxide-lithium alloy, the silicon oxide represented by $SiO_x$ has oxygen in an amount satisfying the range of $0<x<1.5$. If x is greater than 1.5, since Si being a site for electrochemical reaction becomes relatively diminished, a total energy density may be reduced. The silicon oxide core of the present invention has a shell which is the coating layer of a carbon material on the surface thereof, and such a carbon material shell allows the penetration of lithium but disturbs the penetration of oxygen, thereby preventing oxygen of the oxygen-containing lithium salt from reacting with the silicon oxide of the core, and eventually easily controlling an oxygen amount in the silicon oxide.

Also, when a shell as the coating layer of a carbon material is formed on the surface of a core comprising silicon oxide particles prior to mixing with an oxygen-containing lithium salt and heat treatment to form a silicon oxide-lithium alloy in accordance with the present invention, agglomeration of particles does not occur during reaction, unlike the case in which the silicon oxide core is directly mixed with the oxygen-containing lithium salt and is subject to heat treatment to form a silicon oxide-lithium alloy without the formation of the shell as the coating layer of a carbon material. That is, when the silicon oxide core is directly mixed with the oxygen-containing lithium salt and is subject to heat treatment, particles agglomerate during reaction, and further require a pulverization process, whereas when a shell as the coating layer of a carbon material is formed in advance as in the present invention, the agglomeration of particles is prevented by the coating layer of the carbon material, which needs no pulverization process and allows a preparation process to be simply conducted.

The examples of the oxygen-containing lithium salt may include $Li_2B_4O_7$, $LiNO_3$, $LiO_2$, $Li_2O_2$, $Li_2CO_3$, $LiOH(H_2O)$ and LiOH, but are not particularly limited thereto.

Finally, the surface of the core-shell structured ($SiO_x$—$Li_y$)—C composite obtained above is washed, followed by drying (S3).

An unreacted lithium salt or by-products of the reaction between the oxygen-containing lithium salt and the silicon oxides may remain on the surface of the core-shell structured ($SiO_x$—$Li_y$)—C composite obtained above, thereby causing gelation of a slurry in the preparation of an anode.

Accordingly, the remaining lithium sources and by-products of the reaction between lithium sources and silicon oxides should be removed, and for this, in the present invention, the surface of the core-shell structured ($SiO_x$—$Li_y$)—C composite obtained above is washed with a washing solution. As the washing solution, distilled water, ethanol or a strong-acid solution such as chloric acid is preferably used.

The by-products of the oxygen-containing lithium salt may be LiOH, $Li_2CO_3$, $Li_4SiO_4$, $Li_2Si_3O_5$, $Li_2Si_2O_5$, $Li_8O_2(SiO_4)$, or $Li_6(Si_2O_7)$.

After washing the core-shell structured ($SiO_x$—$Li_y$)—C composite obtained above, drying is again carried out to prepare an anode active material.

Also, the present invention provides an anode active material prepared by the above-mentioned method, which comprises a core-shell structured ($SiO_x$—$Li_y$)—C composite ($0<x<1.5$, $0<y<4$) which has a core comprising ($SiO_x$—$Li_y$), and a shell coated on the surface of the core and comprising a carbon material, wherein the core-shell structured ($SiO_x$—$Li_y$)—C composite comprises an unreacted oxygen-containing lithium salt in an amount of 5 wt % or less, and by-products of the reaction between an oxygen-containing lithium salt and silicon oxide in an amount of 10 wt % or less. The anode active material of the core-shell structured ($SiO_x$—$Li_y$)—C composite prepared by the method of the present invention has high capacity, good life characteristics and superior thickness expansion control.

The anode active material of the present invention thus prepared may be used to prepare an anode by a conventional method known in the art. Also, a cathode used in the present invention may be prepared by a conventional method known in the art, similar to the anode. For example, the electrode active material of the present invention is mixed with a binder, a solvent, and optionally a conducting material and a dispersing agent, followed by stirring, to produce a slurry which is then applied on a current collector, followed by compression, to prepare an electrode.

The binder which may be used in the present invention includes various kinds of binder polymers including styrene-butadiene rubber (SBR), carboxymethyl cellulose (CMC), vinylidenefluoride-hexafluoropropylene copolymer (PVDF-co-HFP), polyvinylidenefluoride, polyacrylonitrile, and polymethylmethacrylate.

The cathode active material which may be used in the present invention preferably includes an oxide of a lithium-containing transition metal, for example, any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, a+b+c=1), ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, a+b+c=2), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), $Li_xFePO_4$ ($0.5<x<1.3$), and a mixture thereof. The lithium-containing transition metal oxide may be coated with a metal such as Al or a metal oxide. In addition, a sulfide, selenide, or halide of a lithium-containing transition metal sulfide may also be used.

After the electrode is prepared, a conventional lithium secondary battery including the cathode, the anode, a separator interposed between the cathode and the anode, and an electrolyte solution may be prepared.

The electrolyte solution used in the present invention comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte solution used in the present invention comprises an organic solvent which is conventionally used in an electrolyte solution for a lithium secondary battery, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, vinylene carbonate, sulforane, γ-buryrolactone, propylene sulfite, and tetrahydrofuran and a mixture thereof. In particular, among the above carbonate-based organic solvents, ethylene carbonate and propylene carbonate that are cyclic carbonates are preferred, since they have high viscosity and consequently a high dielectric constant to easily dissociate the lithium salt in the electrolyte. More preferably, such a cyclic carbonate is used as a mixture with a linear carbonate having a low viscosity and a low dielectric constant, such as dimethyl carbonate and diethyl carbonate in a suitable ratio, to provide an electrolyte having a high electric conductivity.

Optionally, the electrolyte solution used in the present invention may further include an additive, such as an overcharge inhibitor which is conventionally used in an electrolyte.

Also, the separator which may be used in the present invention includes, but is not limited to, a single-layered or multi-layered porous polymer film conventionally used as a separator, and a porous non-woven fabric conventionally used as a separator, and the like. The porous polymer film may be made of polyolefin-based polymer, for example, ethylene homopolymer, propylene homopolymer, ethylene/butene copolymer, ethylene/hexene copolymer, and ethylene/methacrylate copolymer, and the porous non-woven fabric may be made of, for example, high-melting glass fibers, polyethylene terephthalate fibers, and the like. However, the present invention is not limited thereto.

A battery case used in the present invention may be any one conventionally used in the art, and the shape of the battery case is not particularly limited depending its uses. For example, the shape of the battery case may be cylindrical, prismatic, pouch, or coin.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLES

Example 1

Preparation of Washed ($SiO_x$—$Li_y$)—C Composite Having a Core-Shell Structure 40 mmol of resorcinol, 40 mol of formaldehyde (3000 ml of 37 wt % aqueous solution), 0.75 mmol of sodium carbonate as a catalyst, and 9.88 mmol of cetyltrimethylammonium bromide (CTAB) were dispersed in 1000 ml of distilled water, and 10 g of silicon oxide powders (SiO, $D_{60}$=5 µm) was added thereto, followed by heating at 85° C. for 3 days, to obtain a resorcinol-formaldehyde (RF) sol solution comprising a core of silicon oxide.

The RF sol solution obtained above was annealed at 900° C. for 5 hours under Ar atmosphere, to obtain a silicon oxide-carbon composite which has a shell of carbon material coated on the surface of the core of silicon oxide. The carbon material was confirmed to be present in an amount of 5 wt %, and the thickness of the shell was measured to be 10 nm.

The silicon oxide-carbon composite obtained above was mixed with $LiOH.H_2O$ in a weight ratio of 65:35 and the mixture was annealed at 700° C. for 5 hours under Ar atmosphere, to obtain a ($SiO_x$—$Li_y$)—C composite having a core-shell structure. The composition of the core-shell structured ($SiO_x$—$Li_y$)—C composite was measured, and as a result, it was confirmed to have values satisfying the range of $0<x<1.5$ and $0<y<4$.

The pH of the core-shell structured ($SiO_x$—$Li_y$)—C composite was 11.5, by-products of LiOH.$H_2O$ were confirmed to be LiOH and $Li_2CO_3$ whose amounts were 0.4 wt % and 0.09 wt %, respectively. In order to remove such by-products of $LiOH.H_2O$, the core-shell structured ($SiO_x$—$Li_y$)—C composite was washed with distilled water 5 times and dried.

Comparative Example 1

Preparation of Silicon Oxide-Carbon Composite Having a Core-Shell Structure 40 mmol of resorcinol, 40 mol of formaldehyde (3000 ml of 37 wt % aqueous solution), 0.75 mmol of sodium carbonate as a catalyst, and 9.88 mmol of cetyltrimethylarnmonium bromide (CTAB) were dispersed in 1000 ml of distilled water, and 10 g of silicon oxide powders (SiO, $D_{60}$=5 µm) was added thereto, followed by heating at 85° C. for 3 days, to obtain a resorcinol-formaldehyde (RF) sol solution comprising a core of silicon oxide.

The RF sol solution obtained above was annealed for 5 hours under Ar atmosphere, to obtain a silicon oxide-carbon composite which has a shell of carbon material coated on the surface of the core of silicon oxide. The carbon material was confirmed to be present in an amount of 5 wt %, and the thickness of the shell was measured to be 10 nm.

Comparative Example 2

Preparation of Unwashed ($SiO_x$—$Li_y$)—C Composite Having a Core-Shell Structure 40 mmol of resorcinol, 40 mol of formaldehyde (3000 ml of 37 wt % aqueous solution), 0.75 mmol of sodium carbonate as a catalyst, and 9.88 mmol of cetyltrimethylammonium bromide (CTAB) were dispersed in 1000 ml of distilled water, and 10 g of silicon oxide powders (SiO, $D_{60}$=5 µm) was added thereto, followed by heating at 85° C. for 3 days, to obtain a resorcinol-formaldehyde (RF) sol solution comprising a core of silicon oxide.

The RF sol solution obtained above was annealed at 900° C. for 5 hours under Ar atmosphere, to obtain a silicon oxide-carbon composite which has a shell of carbon material coated on the surface of the core of silicon oxide. The carbon material was confirmed to be present in an amount of 5 wt %, and the thickness of the shell was measured to be 10 nm.

The silicon oxide-carbon composite obtained above was mixed with $LiOH.H_2O$ in a weight ratio of 65:35 and the mixture was annealed at 700° C. for 5 hours under Ar atmosphere, to obtain a ($SiO_x$—$Li_y$)—C composite having a core-shell structure. The composition of the core-shell structured ($SiO_x$—$Li_y$)—C composite was measured, and as a result, it was confirmed to have values corresponding to the range of $0<x<2$ and $0<y<5$.

The pH of the core-shell structured ($SiO_x$—$Li_y$)—C composite was 11.5, by-products of $LiOH.H_2O$ were confirmed to be LiOH and $Li_2CO_3$ whose amounts were 0.4 wt % and 0.09 wt %, respectively.

Comparative Example 3

Preparation of Washed $SiO_x$—$Li_y$ Composite Having No Shell of Carbon Material Silicon oxide powders (SiO, $D_{60}$=5 µm) was mixed with $LiOH.H_2O$ in a weight ratio of 65:35 and the mixture was annealed at 700° C. for 5 hours under Ar atmosphere, to obtain a $SiO_x$—$Li_y$ composite. The composition of the $(SiO_x$—$Li_y)$—C composite was measured, and as a result, it was confirmed to have values corresponding to the range of $0.5<x<5$ and $1<y<5$.

The pH of the $SiO_x$—$Li_y$ composite was 11.5, by-products of $LiOH.H_2O$ were confirmed to be LiOH and $Li_2CO_3$ whose amounts were 0.4 wt % and 0.09 wt %, respectively. In order to remove such by-products of $LiOH.H_2O$, the $SiO_x$—$Li_y$ composite was washed with distilled water once and dried.

Comparative Example 3

Preparation of Unwashed $SiO_x$—$Li_y$ Composite Having No Shell of Carbon Material Silicon oxide powders (SiO, $D_{60}$=5 μm) was mixed with $LiOH.H_2O$ in a weight ratio of 65:35 and the mixture was annealed at 700° C. for 5 hours under Ar atmosphere, to obtain a $SiO_x$—$Li_y$ composite. The composition of the $(SiO_x$—$Li_y)$—C composite was measured, and as a result, it was confirmed to have values corresponding to the range of $0.5<x<5$ and $0<y<5$.

The pH of the $SiO_x$—$Li_y$ composite was 11.5, by-products of $LiOH.H_2O$ were confirmed to be LiOH and $Li_2CO_3$ whose amounts were 0.4 wt % and 0.09 wt %, respectively.

Example 2

Preparation of Coin-Type Secondary Battery

The anode active material prepared in Example 1 was mixed with graphite in a weight ratio of 15:85, and the mixture, vapor growth carbon fiber (VGCF) as a conductive material, styrene-butadiene rubber (SBR) and carboxymethyl cellulose (CMC) were mixed at a ratio of 95.8:1:1.5:1.7 (wt %), and the resultant was added to distilled water as a solvent, to obtain a uniform electrode slurry. The electrode slurry obtained was coated on one surface of a copper current collector in a thickness of 65 μm, dried and compressed, followed by punching to the desired size, to obtain an anode.

Metallic lithium was used as a cathode, and a polyolefin separator was interposed between the anode and the cathode, to obtain an electrode assembly.

Ethylene carbonate (EC) and diethyl carbonate (DEC) were mixed at a ratio of 30:70 (vol %), and $LiPF_6$ was added thereto, to obtain 1M $LiPF_6$ of non-aqueous electrolyte solution.

The non-aqueous electrolyte solution was introduced in the electrode assembly obtained above, to prepare a coin-type secondary battery.

Comparative Examples 5 to 8

Preparation of Coin-Type Secondary Battery

The procedure of Example 2 was repeated except that each of the anode active materials prepared in Comparative Examples 1 to 4 was used, to prepare a coin-type secondary battery.

Experimental Example 1

Charge/Discharge Characteristics of Secondary Battery

The coin-type secondary batteries prepared in Example 2 and Comparative Examples 5 to 8 were evaluated for their characteristics of $1^{st}$ charge/discharge and life cycles.

<Charge/Discharge Conditions of Coin-Type Secondary Batteries>

Charge of batteries was conducted up to 5 mV at constant current, and completed when a current density reached 0.005 C.

Discharge of batteries was conducted up to 1.0 V at constant current.

TABLE 1

| | Discharge Capacity (mAh/g) | Capacity before charging (mAh/g) | Initial Efficiency (%) | Normalized Capacity (%) @ $50^{th}$ cycle | Expansion (1.6 g/cc) |
|---|---|---|---|---|---|
| Ex. 2 | 490.5 | 550.4 | 89.1 | 90% | 38.5 |
| Com. Ex. 5 | 501.8 | 615.7 | 81.5 | 83% | 52.1 |
| Com. Ex. 6 | 483.9 | 542.8 | 89.1 | 85% | 47.1 |
| Com. Ex. 7 | 429.3 | 512.9 | 83.7 | 80% | 41.7 |
| Com. Ex. 8 | 425.7 | 512.9 | 83.0 | 76% | 49.3 |

As can be seen from Table 1, the secondary battery of Example 2 exhibited an initial efficiency increased by about 8% and a life characteristic increased by 7% after 50 cycles, as compared with the secondary battery of Comparative Example 5. Since Example 2 used the anode active material of Example 1 which was obtained by mixing silicon oxide-carbon with $LiOH.H_2O$, followed by heat treatment, the silicon oxide-carbon particles contain lithium, and since lithium was already contained before initial charge/discharge of the battery, initial efficiency was raised. Also, when the anode active material of Example 1 was used, irreversible phase materials such as lithium oxide and lithium-metal oxide were less formed, and thus structural changes due to irreversible production were reduced during charge/discharge, thereby improving a life characteristic and a thickness-expansion rate.

The secondary battery of Example 2 using the anode active material of Example 1 exhibited improved life and thickness characteristics, as compared with secondary battery of Comparative Example 6 using the anode active material of Comparative Example 2. This results from when silicon oxide-carbon reacts with $LiOH.H_2O$, by-products of $LiOH.H_2O$, such as LiOH remained on the surface of the $(SiO_x$—$Li_y)$—C composite, such as LiOH being a base having a high pH value which may change the properties of a binder and deteriorate a slurry in a mixing step. Owing to such by-products of $LiOH.H_2O$, the binder cannot do its function of controlling the volume expansion of active materials, and the active materials having difficulty in uniformly mixing. Accordingly, the anode active material of Example 1 was washed to remove remaining by-products of $LiOH.H_2O$, thereby providing increased life and thickness characteristics.

In the secondary batteries of Comparative Examples 7 and 8 each using an anode active material not having a shell of carbon, the value of x in $SiO_x$ increased owing to oxygen of LiOH, from which large amounts of oxygen reacted with lithium during a charging process and irreversible phase materials increased, thereby deteriorating an initial efficiency and a life characteristic.

What is claimed is:

1. A lithium secondary battery, comprising:
a cathode;
an anode; and
a separator interposed between the cathode and the anode, wherein the anode comprises:
a current collector; and
an anode active material layer formed on at least one surface of the current collector and comprising an anode active material, wherein the anode active material comprising a core-shell structured $(SiO_x—Li_y)$—C composite ($0<x<1.5$, $0<y<4$) which has a core comprising $(SiO_x—Li_y)$, and a shell coated on the surface of the core and comprising a carbon material,
wherein the core-shell structured $(SiO_x—Li_y)$—C composite comprises an unreacted oxygen-containing lithium salt in an amount of 5 wt % or less, and by-products of the reaction between an oxygen-containing lithium salt and silicon oxide in an amount of 10 wt % or less, and
wherein the battery has a normalized capacity at the $50^{th}$ cycle of greater than 85%.

2. The lithium secondary battery according to claim 1, wherein the carbon material is crystalline carbon or amorphous carbon.

3. The lithium secondary battery according to claim 1, wherein the core comprising silicon oxide particles has a diameter of 0.05 to 30 μm.

4. The lithium secondary battery according to claim 1, wherein in the shell being a coating layer comprising a carbon material, the carbon material is present in an amount of 0.05 to 30 wt % based on the weight of the anode active material.

5. The lithium secondary battery according to claim 1, wherein the by-products of the oxygen-containing lithium salt is LiOH, $Li_2CO_3$, $Li_4SiO_4$, $Li_2Si_3O_5$, $Li_2Si_2O_5$, $Li_8O_2(SiO_4)$, $Li_6(Si_2O_7)$, or a mixture thereof.

* * * * *